(12) United States Patent
Notarange et al.

(10) Patent No.: US 9,627,950 B2
(45) Date of Patent: Apr. 18, 2017

(54) METHOD OF SERVICING A POWER GENERATOR

(71) Applicant: Siemens Energy, Inc., Orlando, FL (US)

(72) Inventors: Craig P. Notarange, Orlando, FL (US); David Thomas Allen, Longwood, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 14/863,791

(22) Filed: Sep. 24, 2015

(65) Prior Publication Data

US 2016/0013708 A1  Jan. 14, 2016

Related U.S. Application Data

(63) Continuation of application No. 12/352,732, filed on Jan. 13, 2009, now abandoned.

(60) Provisional application No. 61/037,887, filed on Mar. 19, 2008.

(51) Int. Cl.
*H02K 15/00* (2006.01)
*H02K 15/06* (2006.01)
*H02K 1/18* (2006.01)

(52) U.S. Cl.
CPC ............. *H02K 15/06* (2013.01); *H02K 1/185* (2013.01); *H02K 15/0006* (2013.01); *Y10T 29/49009* (2015.01)

(58) Field of Classification Search
CPC ...... H02K 15/0006; H02K 15/00; H02K 1/18; Y10T 29/49009; Y10T 29/53143; Y10T 29/4973; Y10T 29/53265; Y10T 29/53274

USPC ......... 29/596, 5, 598, 609; 310/91, 216.049, 310/418

See application file for complete search history.

(56) References Cited

U.S. PATENT DOCUMENTS

| 3,708,707 A | 1/1973 | Kranz |
| 4,327,303 A | 4/1982 | Jacobsen |
| 4,425,523 A | 1/1984 | Detinko et al. |
| 4,564,779 A * | 1/1986 | Terry, Jr. ................ H02K 1/185 29/596 |
| 4,634,909 A | 1/1987 | Brem |

(Continued)

FOREIGN PATENT DOCUMENTS

| CN | 1042033 A | 4/1990 |
| EP | 1594213 A2 | 11/2005 |

(Continued)

*Primary Examiner* — Thiem Phan

(57) ABSTRACT

A method of servicing a stator frame of a power generator. The method includes removing a first stator core from a main housing of the stator frame, removing a plurality of first dove-tail shaped keybars that extend axially within and are coupled to a main support structure forming part of the main housing, and installing a plurality of second keybars in the main support structure in place of the first dove-tail shaped keybars. The second keybars are adapted to support a second stator core. Each of the second keybars has a generally rounded engagement surface and the second stator core includes recesses with shapes corresponding to the generally rounded engagement surfaces of the second keybars such that the second stator core can be securely supported in the main support structure by the second keybars.

9 Claims, 4 Drawing Sheets

(56) References Cited

U.S. PATENT DOCUMENTS

| | | | |
|---|---|---|---|
| 4,891,540 A * | 1/1990 | Cooper | H02K 1/185 |
| | | | 310/433 |
| 5,875,540 A | 3/1999 | Sargeant et al. | |
| 6,104,116 A | 8/2000 | Fuller et al. | |
| 7,202,587 B2 | 4/2007 | Sargeant et al. | |
| D544,325 S | 6/2007 | Wright | |
| 7,302,754 B2 | 12/2007 | Majernik et al. | |
| 7,353,586 B2 | 4/2008 | Majernik et al. | |
| 7,395,594 B2 | 7/2008 | Allen et al. | |
| 2005/0235479 A1 | 10/2005 | Allen et al. | |
| 2005/0235480 A1 | 10/2005 | Majernik et al. | |
| 2008/0042514 A1 | 2/2008 | Cook et al. | |

FOREIGN PATENT DOCUMENTS

| | | | |
|---|---|---|---|
| JP | 11309616 A | 11/1999 |
| JP | 2000278918 A | 10/2000 |
| KR | 2011056236 A | 5/2011 |

* cited by examiner

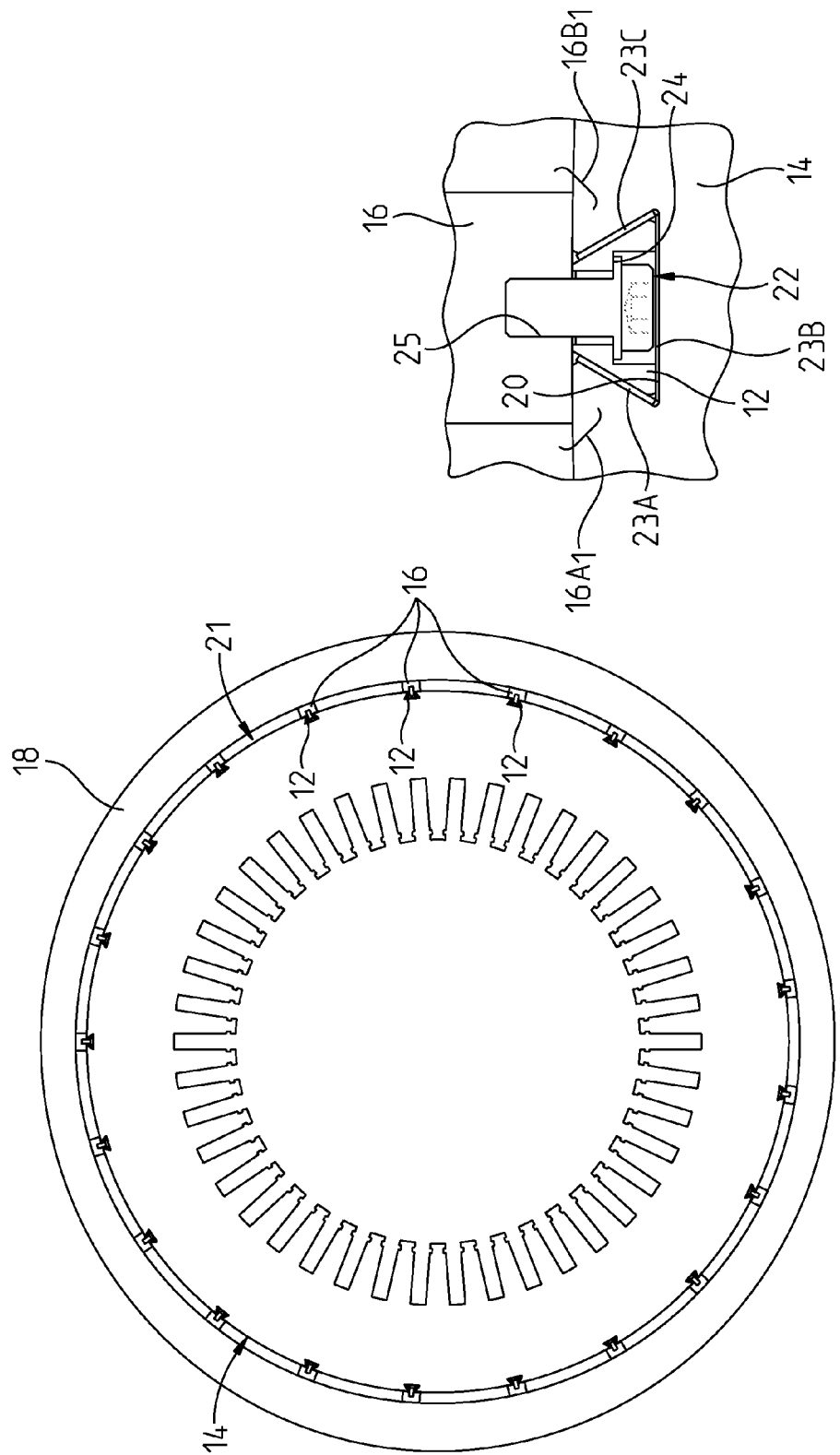

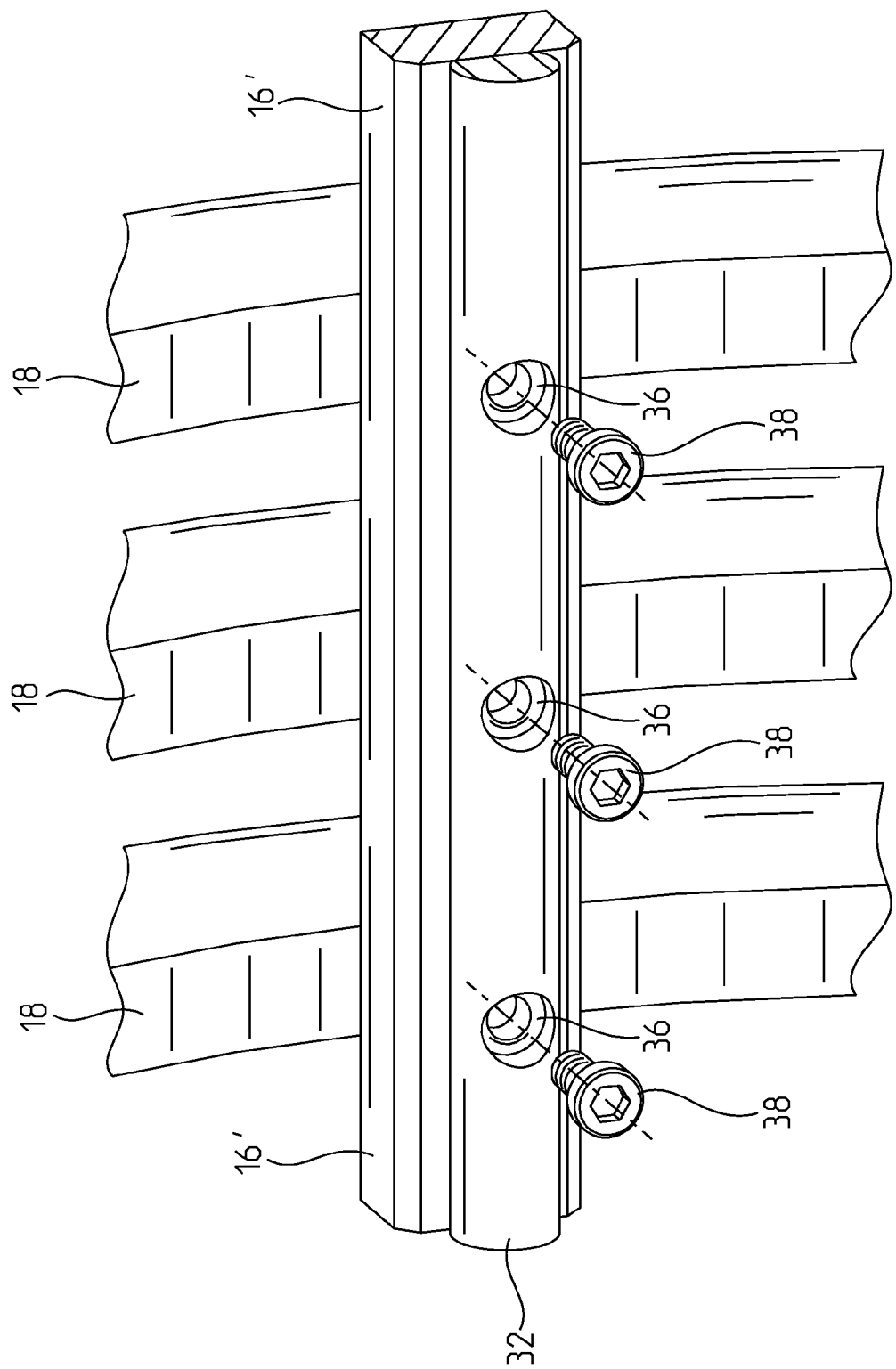

METHOD OF SERVICING A POWER GENERATOR

CROSS-REFERENCE TO RELATED APPLICATIONS

This application is a continuation of U.S. patent application Ser. No. 12/352,732, filed Jan. 13, 2009, and entitled "METHOD OF SERVICING A POWER GENERATOR," which claims the benefit of U.S. Provisional Application Ser. No. 61/037,887, entitled "CORE TO FRAME ATTACHMENT IN A UNIT WITHOUT BUILDING BOLTS," filed Mar. 19, 2008, the entire disclosures of each of which are incorporated by reference herein.

FIELD OF THE INVENTION

The present invention relates to power generators, and more particularly, to a method of servicing stator frames in power generators.

BACKGROUND OF THE INVENTION

U.S. Pat. No. 5,875,540, the entire disclosure of which is incorporated by reference herein, discloses a process for forming a stator core in a stator frame. The process involves forming a plurality of core modules or donuts, each of which comprises a plurality of stator core rings laminated together. The stator frame is placed in an upright position. A predefined number of the core modules are then lowered into the upright stator frame. For a power generator which has been in operation for some time and is in need of a new stator core, turning its stator frame upright to receive a new stator core can be very difficult.

U.S. Pat. Nos. 7,302,754; 7,353,586; and 7,395,594, the entire disclosures of which are incorporated by reference herein, are directed at installing stator cores into stator frames without placing the stator frame in an upright position. U.S. Pat. No. 7,202,587, the entire disclosure of which is also incorporated by reference herein, discloses mounting stator core donuts having enlarged grooves in a stator frame using wedges that disperse forces to the donuts in a circumferential manner. The enlarged grooves make installing the donuts less difficult, while the wedges ensure a tight fit of the laminations within the stator frame.

FIG. 1 illustrates a known stator frame 10 for a power generator. The stator frame 10 comprises a main housing 11 for supporting a stator core, not shown in FIG. 1. The main housing 11 comprises an outer structure 13 and a main support structure 15 coupled to the outer structure 13. The main support structure 15 comprising a plurality of stator bore or support rings 18 coupled to the outer structure 13 and a plurality of frame beams 16 coupled to the stator bore rings 18. The main housing 11 further comprises a plurality of dove-tail shaped building bolts or keybars 12 coupled to the frame beams 16. The stator core, not shown in FIG. 1, is supported in the stator frame 10 via the keybars 12.

FIG. 2 illustrates a stator core lamination or donut 14 comprising a plurality of stator core rings (also referred to as laminations) laminated or otherwise coupled together and configured to be supported on the keybars 12 illustrated in FIG. 1. It is noted that a plurality of the stator core donuts 14 are stacked together within the stator frame 10 to form the stator core. Referring now to FIG. 2, each stator core donut 14 includes a plurality of slots or grooves 20 (see FIG. 3) along its outer periphery to receive the keybars 12. The grooves 20 have a dove-tail shape corresponding to the shape of the keybars 12 to ensure a secure and tight fit within the stator frame 10, as more clearly shown in FIG. 3. It is noted that small radial gaps 21 are formed between the periphery of each stator core donut 14 and the inner diameter of the support rings 18, as shown in FIG. 2. It is also noted that one or more mounting assist structures 23A, 23B, 23C may be disposed in each groove 20 between the stator core donut 14 and the corresponding keybar 12. The mounting assist structures 23A, 23B, 23C assist in securing a tight fit between the stator core donut 14 and the keybars 12.

SUMMARY OF THE INVENTION

In accordance with a first aspect of the present invention, a method of servicing a stator frame of a power generator is provided. The method comprises removing a first stator core from a main housing of the stator frame, removing a plurality of first dove-tail shaped keybars that extend axially within and are coupled to a main support structure forming part of the main housing, and replacing the first dove-tail shaped keybars from the stator frame with a plurality of second keybars by installing the second keybars in the main support structure where the first dove-tail shaped keybars were previously located. The second keybars are adapted to support a second stator core. Each of the second keybars has a generally rounded engagement surface and the second stator core includes recesses with shapes corresponding to the generally rounded engagement surfaces of the second keybars such that the second stator core can be securely supported by the main support structure via the second keybars.

The main support structure may comprise a plurality of stator bore rings and a plurality of frame beams, wherein the second keybars are coupled to the frame beams.

Installing a plurality of second keybars in the main support structure may comprise bolting the second keybars to the frame beams.

Bolting the second keybars to the frame beams may comprise installing bolts into counter-bored holes until end portions of the bolts are inserted past a radially inner surface of the second keybars.

The method may further comprise installing the second stator core onto the second keybars.

The method may further comprise servicing the frame beams such that the second stator core can be more easily axially slid onto the second keybars without the second stator core contacting the frame beams.

Servicing the frame beams may comprise removing radially inner corner edges of the frame beams to create a radial clearance for a radial outer edge of the second stator core.

A portable milling machine may be utilized to remove the radially inner corner edges of the frame beams.

In accordance with a second aspect of the present invention, a kit for servicing a stator frame of a power generator is provided, wherein the stator frame includes dove-tail keybars installed therein supporting a first stator core within a main support structure of a main housing. The kit comprises a plurality of second keybars and fasteners to couple the second keybars to the main support structure of the main housing. Each of the second keybars has a generally rounded engagement surface and is adapted to replace the dove-tail shaped keybars once the dove-tail keybars are removed from the main support structure of the stator frame. The second keybars are adapted to support a second stator core in the main support structure. The second stator core includes recesses with shapes corresponding to the generally rounded engagement surfaces of the second keybars.

The main support structure may comprise a plurality of stator bore rings and a plurality of frame beams, wherein the second keybars are coupled to the frame beams with the fasteners.

The fasteners may comprise bolts, which may be installed through counter-bored holes in the second keybars.

End portions of the second keybars may extend further radially inwardly than a radial end of the bolts.

The kit may further comprise a portable milling machine for removing radially inner corner edges of the frame beams to create a radial clearance for a radial outer edge of the second stator core.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 2 is a cross sectional view of an inner portion of the prior art generator frame illustrated in FIG. 1 and further including a prior art stator core donut;

FIG. 3 is an enlarged cross sectional view of a portion of the prior art generator frame and a portion of the stator core donut illustrated in FIG. 2;

FIG. 6 is an exploded perspective view of a portion of the replacement keybar illustrated in FIG. 5.

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

After periods of electrical power generator use, it may become necessary to replace a stator core within a stator core frame of the power generator. As mentioned above, U.S. Pat. Nos. 7,302,754; 7,353,586; and 7,395,594 are directed at installing stator cores into stator frames without placing the stator frame in an upright position. Typically, the systems, structures, and methods disclosed by these patents are utilized with keybars having rounded engagement surfaces, i.e., the keybars are generally rounded in shape. This is because replacement of a stator core onto rounded keybars using a horizontal replacement process is believed to be easier and more efficient as compared to replacement of a stator core onto dove-tail shaped keybars.

Figure 1:
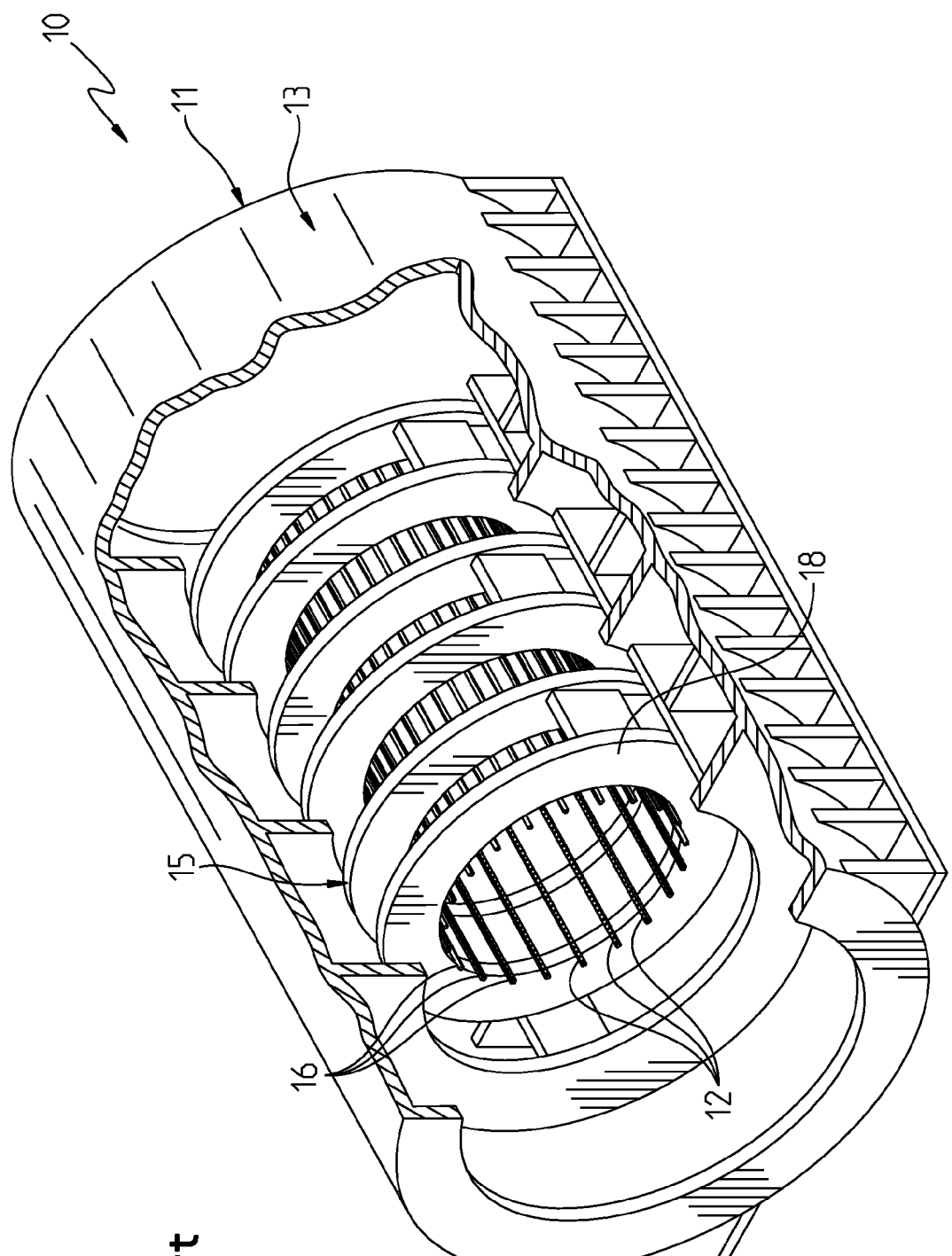
FIG. 1 is a cut-away perspective view of a prior art generator frame including an annular array of dove-tail shaped keybars.

As shown in FIG. 1, a power generator stator frame 10 may comprise a main housing 11 for supporting a stator core, not shown in FIG. 1. The main housing 11 comprises an outer structure 13 and a main support structure 15 coupled to the outer structure 13. The main support structure 15 comprising a plurality of stator bore rings 18 fixedly coupled to the outer structure 13 and a plurality of frame beams 16 fixedly coupled to the stator bore rings 18. The main housing 11 further comprises a plurality of building bolts or keybars 12, which are dove-tail shaped in FIG. 1, and coupled to the frame beams 16. The stator core, not shown in FIG. 1, is supported in the stator frame 10 via the keybars 12.

In accordance with the present invention, after a stator core mounted to dove-tail shaped keybars 12 of a stator frame 10 is removed, the dove-tail shaped keybars 12 are then removed and replaced with generally rounded or cylindrical-shaped keybars followed by the installation of a new stator core onto the rounded keybars. By replacing the dove-tail shaped keybars 12 with rounded keybars, it is believed that installation of the new stator core within the stator core frame having rounded keybars will be accomplished in a more efficient manner.

Donuts 14 mounted on dove-tail shaped keybars 12, see FIGS. 1-3, and defining a stator core to be replaced, are removed according to any traditional method(s) for removing such a stator core from a corresponding stator frame. For example, the stator core donuts 14 may be individually removed one by one by axially sliding the stator core donuts 14 along the dove-tail shaped keybars 12 until all stator core donuts 14 are removed from the stator frame 10. It is noted that donuts 14 comprise two or more stator core rings laminated together. Instead of using donuts 14 in the present invention, individual stator core rings or laminations may be used instead.

Once the stator core donuts 14 are removed from the stator frame 10, the dove-tail shaped keybars 12 are removed from the frame beams 16 by removing fasteners 22, such as bolts, extending through counter-bored holes 24 (see FIG. 3) formed in the keybars 12 and through corresponding holes 25 formed in the frame beams 16. Removing the fasteners 22 frees each keybar 12 from its respective frame beam 16.

Figures 4, 5:
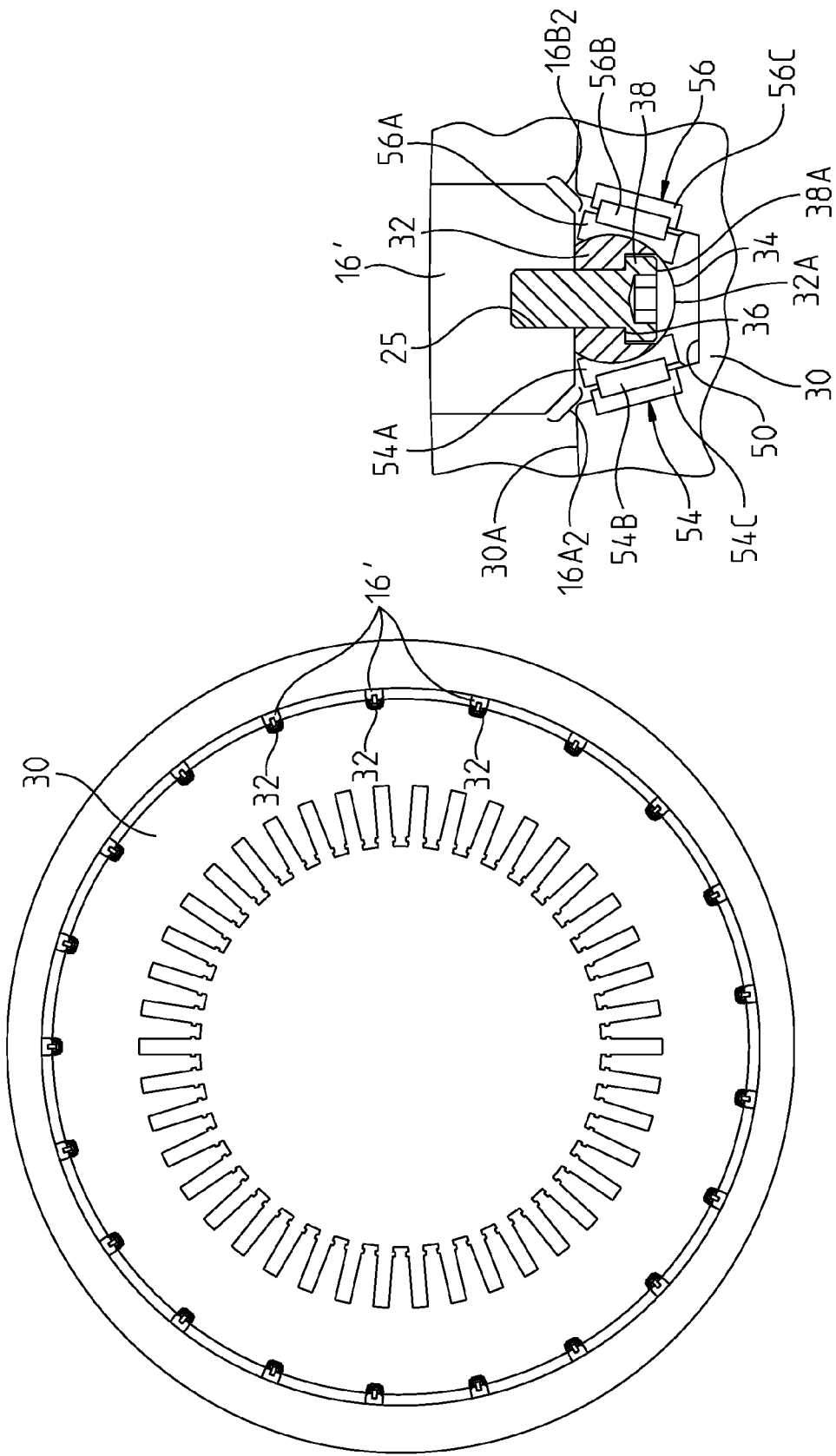
FIG. 4 is a cross sectional view of a portion of a generator frame including a replacement donut after the generator frame has been serviced according to embodiments of the invention.
FIG. 5 is an enlarged cross sectional view of a portion of the replacement donut illustrated in FIG. 4 and a replacement keybar installed in the generator frame illustrated in FIG. 4 during the servicing thereof.

In order for a replacement donut 30 (see FIG. 4) to be more easily installed in the stator frame 10 and in accordance with the present invention, one or more of the frame beams 16 are serviced by removing radially inner corner edges $16A_1$, $16B_1$ (see FIG. 3) of the frame beams 16, such that the modified frame beams 16' comprise beveled radially inner corner edges $16A_2$, $16B_2$ (see FIG. 5). The beveled radially inner corner edges $16A_2$, $16B_2$ provide an amount of radial clearance between the frame beams 16' and a radial outer edge 30A of each of the replacement donuts 30. The beveled radially inner corner edges $16A_2$, $16B_2$ may be formed in the frame beams 16', for example, by grinding the radially inner corner edges $16A_1$, $16B_1$ using a portable milling machine (not shown), such as, for example, a TKF1500-0 model adjustable angle beveller manufactured by Trumpf Inc. of Farmington, Conn.

Replacement building bolts or keybars 32 are then installed on the frame beams 16' in generally the same locations as the previously removed keybars 12. As shown in FIG. 5, the replacement keybars 32 are generally rounded in shape and comprise a generally rounded engagement surface 34 instead of the dove-tail shape of the removed keybars 12.

The replacement keybars 32 include counter-bored holes 36 formed therein, as shown in FIGS. 5 and 6, which counter-bored holes 36 may be substantially aligned with the holes 25 formed in the frame beams 16', although it is understood that new holes (not shown) may be formed in the frame beams 16' and aligned with the counter-bored holes 36 in the replacement keybars 32 if desired. Fasteners 38, depicted in FIGS. 5 and 6 as bolts, are then inserted into the counter-bored holes 36 in the replacement keybars 32 and threaded into the corresponding holes 25 in the frame beams 16' to secure the replacement keybars 32 to the frame beams 16'. The fasteners 38 may be inserted into the counter-bored holes 36 until a radially inner surface 32A of the corresponding replacement keybar 32 extends further radially inwardly than an end portion 38A of each of the fasteners 38, i.e., until the fasteners 38 are not extending out past the radially inner surfaces 32A of the replacement keybars 32. Thus, the replacement donuts 30 can be axially slid on the replacement keybars 32 without contacting the fasteners 38.

As shown in FIG. 5, the replacement donuts 30 include grooves 50. Each replacement donut 30 is positioned relative to the stator frame 10 such that each groove 50 is aligned with a corresponding replacement keybar 32. Thereafter, the replacement donut 30 is horizontal moved into the stator frame such that the replacement keybars 32 are received in a corresponding one of the grooves 50 in the replacement donut 30. The replacement donuts 30 may be installed into the stator frame using the structures and methods set out in U.S. Pat. Nos. 7,302,754, 7,353,586, and 7,395,594. Alternatively, any other suitable structures and methods can be used to install the replacement donuts 30 into the stator frame 10. A plurality of donuts 30 are installed in this fashion until a predetermined number have been installed so as to define a replacement stator core.

In the illustrated embodiment, the grooves 50 are slightly oversized to allow for easier installation of the donuts 30 onto the replacement keybars 32. So as to create a tight fit between each donut 30 and the replacement keybars 32, first and second wedge structure assemblies 54 and 56 are provided in each groove 50 between the donut 30 and the corresponding keybar 32, see FIG. 5. Each of the first and second wedge structure assemblies 54, 56 in the embodiment shown comprises a filler member 54A, 56A, and first and second wedges 54B, 54C and 56B, 56C. In the illustrated embodiment, six donuts 30, each having a width of about six inches, are set in position. Thereafter, the first and second wedges 54B, 54C and 56B, 56C and filler members 54A, 56A, each about 36 inches long, are installed. The first and second wedge structure assemblies 54 and 56 are utilized to aid in mounting the replacement donuts 30 on the replacement keybars 32 and to secure a tight fit between the replacement donuts 30 and the replacement keybars 32. It is understood that other types of mounting assist structures may be used as desired.

As noted above, the replacement of a stator core onto rounded keybars using a horizontal replacement process is believed to be easier and more efficient as compared to replacement of a stator core onto dove-tail shaped keybars. Hence, replacing the dove-tail shaped keybars 12 with the replacement keybars 32 facilitates an easier replacement of a stator core within the stator frame 10. In particular, since tooling, methods, and structure have been developed to replace stator cores within stator frames using horizontal processes and cylindrical-shaped keybars, these developed tooling, methods, and structure can be utilized in the stator frames 10 once the replacement keybars 32 are installed. For example, the use of the replacement donuts 30 and the first and second wedge structure assemblies 54, 56 with the replacement cylindrical-shaped keybars 32 avoids developing new tooling, methods, and structure that would be required to use a horizontal process to replace a stator core in a stator frame that includes dove-tail shaped keybars.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of servicing a stator frame of a power generator comprising:
   removing a first stator core from a main housing of the stator frame;
   removing a plurality of first dove-tail shaped keybars that extend axially within and are coupled to a main support structure forming part of the main housing of the stator frame; and
   replacing the first dove-tail shaped keybars from the stator frame with a plurality of second keybars by installing the second keybars in the main support structure where the first dove-tail shaped keybars were previously located, the second keybars adapted to support a second stator core, each of the second keybars having a generally rounded engagement surface, the second stator core having recesses with shapes corresponding to the generally rounded engagement surfaces of the second keybars such that the second stator core can be securely supported by the main support structure via the second keybars.

2. The method according to claim 1, wherein the main support structure of the main housing of the stator frame comprises a plurality of stator bore rings and a plurality of frame beams, the second keybars being coupled to the frame beams.

3. The method according to claim 2, wherein said step of installing a plurality of second keybars in the main support structure comprises bolting the second keybars to the frame beams.

4. The method according to claim 3, wherein said step of bolting the second keybars to the frame beams comprises installing bolts into counter-bored holes formed in the second keybars.

5. The method according to claim 3, further comprising installing the second stator core onto the second keybars.

6. The method according to claim 5, wherein said step of installing the bolts into counter-bored holes formed in the second keybars comprises installing the bolts into the counter-bored holes until end portions of the bolts are inserted past a radially inner surface of the second keybars.

7. The method according to claim 2, further comprising servicing the frame beams such that the second stator core can be more easily axially slid onto the second keybars without the second stator core contacting the frame beams.

8. The method according to claim 7, wherein said step of servicing the frame beams comprises removing radially inner corner edges of the frame beams to create a radial clearance for a radial outer edge of the second stator core.

9. The method according to claim 8, wherein a portable milling machine is utilized to remove the radially inner corner edges of the frame beams.

* * * * *